(12) United States Patent
Royyuru et al.

(10) Patent No.: US 11,531,976 B2
(45) Date of Patent: Dec. 20, 2022

(54) SYSTEMS AND METHODS FOR FACILITATING CARD PRESENT TRANSACTIONS

(71) Applicant: First Data Corporation, Greenwood Village, CO (US)

(72) Inventors: Vijay Kumar Royyuru, Norristown, PA (US); Jerome Wendell Myers, Douglasville, GA (US); Brent Dewayne Adkisson, Omaha, NE (US); Jeffrey Scott Sanchez, Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 796 days.

(21) Appl. No.: 16/232,917

(22) Filed: Dec. 26, 2018

(65) Prior Publication Data

US 2019/0130381 A1    May 2, 2019

Related U.S. Application Data

(62) Division of application No. 13/755,604, filed on Jan. 31, 2013, now Pat. No. 10,198,725.

(60) Provisional application No. 61/592,934, filed on Jan. 31, 2014.

(51) Int. Cl.
| | |
|---|---|
| *G06Q 20/30* | (2012.01) |
| *G06Q 20/20* | (2012.01) |
| *G06Q 20/40* | (2012.01) |
| *G06Q 20/42* | (2012.01) |
| *G06Q 20/32* | (2012.01) |

(52) U.S. Cl.
CPC .......... *G06Q 20/322* (2013.01); *G06Q 20/20* (2013.01); *G06Q 20/3223* (2013.01); *G06Q 20/4097* (2013.01); *G06Q 20/425* (2013.01)

(58) Field of Classification Search
CPC .. G06Q 20/322; G06Q 20/20; G06Q 20/3223; G06Q 20/4097; G06Q 20/425
See application file for complete search history.

(56) References Cited

U.S. PATENT DOCUMENTS

| 5,914,472 | A | * | 6/1999 | Foladare | ............ G06Q 20/4037 |
| | | | | | 235/380 |
| 8,676,249 | B2 | | 3/2014 | Rosenberg | |
| 2002/0073027 | A1 | | 6/2002 | Hui et al. | |
| 2008/0275748 | A1 | * | 11/2008 | John | ...................... G06F 21/35 |
| | | | | | 705/35 |
| 2009/0125440 | A1 | * | 5/2009 | Maeng | .................. G06Q 40/00 |
| | | | | | 705/38 |
| 2009/0182674 | A1 | | 7/2009 | Patel et al. | |

(Continued)

*Primary Examiner* — Jessica Lemieux
(74) *Attorney, Agent, or Firm* — Foley & Lardner LLP

(57) ABSTRACT

This disclosure describes systems and methods related to facilitating card present transaction. In one embodiment, a service provider system may receive a request from a merchant to initiate a card present transaction associated with a consumer. The service provider system may determine an identifier associated with a mobile device associated with the consumer. The service provider system may communicate to the mobile device, based at least in part on the identifier, a message that facilitates invocation of a transaction module associated with the mobile device. The service provider system may facilitate the car present transaction based at least in part on an interaction with the transaction module.

24 Claims, 6 Drawing Sheets

(56) References Cited

U.S. PATENT DOCUMENTS

2012/0296741 A1 11/2012 Dykes
2013/0013499 A1 1/2013 Kalgi

* cited by examiner

SYSTEMS AND METHODS FOR FACILITATING CARD PRESENT TRANSACTIONS

CROSS-REFERENCE TO RELATED APPLICATIONS

This application claims priority to both U.S. Provisional Patent Application No. 61/592,934, entitled "Systems and Methods for Facilitating Card Present Transactions," filed on Jan. 31, 2012, and to U.S. patent application Ser. No. 13/755,604, entitled "Systems and Methods for Facilitating Card Present Transactions," filed on Jan. 31, 2013, issued as U.S. Pat. No. 10,198,725, the contents of which are both incorporated by reference herein in their entirety.

TECHNICAL FIELD

Embodiments of the disclosure relate generally to payment transactions, and more specifically, to the facilitation of card present payment transactions.

BACKGROUND

A wide variety of different types of payment transactions are performed on behalf of merchants and consumers, including electronic commerce ("eCommerce") payment transactions performed via the Internet and point-of-sale transactions. In a typical eCommerce transaction, a consumer utilizes a consumer device (e.g., a personal computer) to access one or more merchant Web sites, and the consumer selects products to be purchased. During a checkout proceeding, the consumer provides payment account information, such as a credit card or debit card number, to a merchant system. The merchant system then generates a payment authorization request utilizing the payment account information, and the payment authorization request is communicated to a payment account issuer for processing.

Conventional eCommerce payment transactions are considered "card not present" ("CNP") transactions because a physical payment device (e.g., a payment card) has not been read by the merchant. Accordingly, a higher level of risk may be attributed to the transactions, thereby leading to increased pricing and/or liability concerns. However, with the increasing use of new payment devices by consumers, such as transaction-enabled mobile devices, there is an opportunity for improved systems and methods that facilitate card present eCommerce transactions.

A purchase transaction at a point-of-sale ("POS") typically involves the provision of payment information from a consumer payment device to a merchant terminal. For example, a consumer payment card is typically swiped by a merchant in order to read magnetic stripe information from the card. With the increasing use of new types of payment devices, such as contactless smart card or a near field communication ("NFC") mobile device, a merchant can use a contactless reader to collect payment account information from a payment device. Accordingly, there is an opportunity for improved systems and methods for facilitating transactions at a merchant point of sale.

BRIEF DESCRIPTION OF THE FIGURES

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
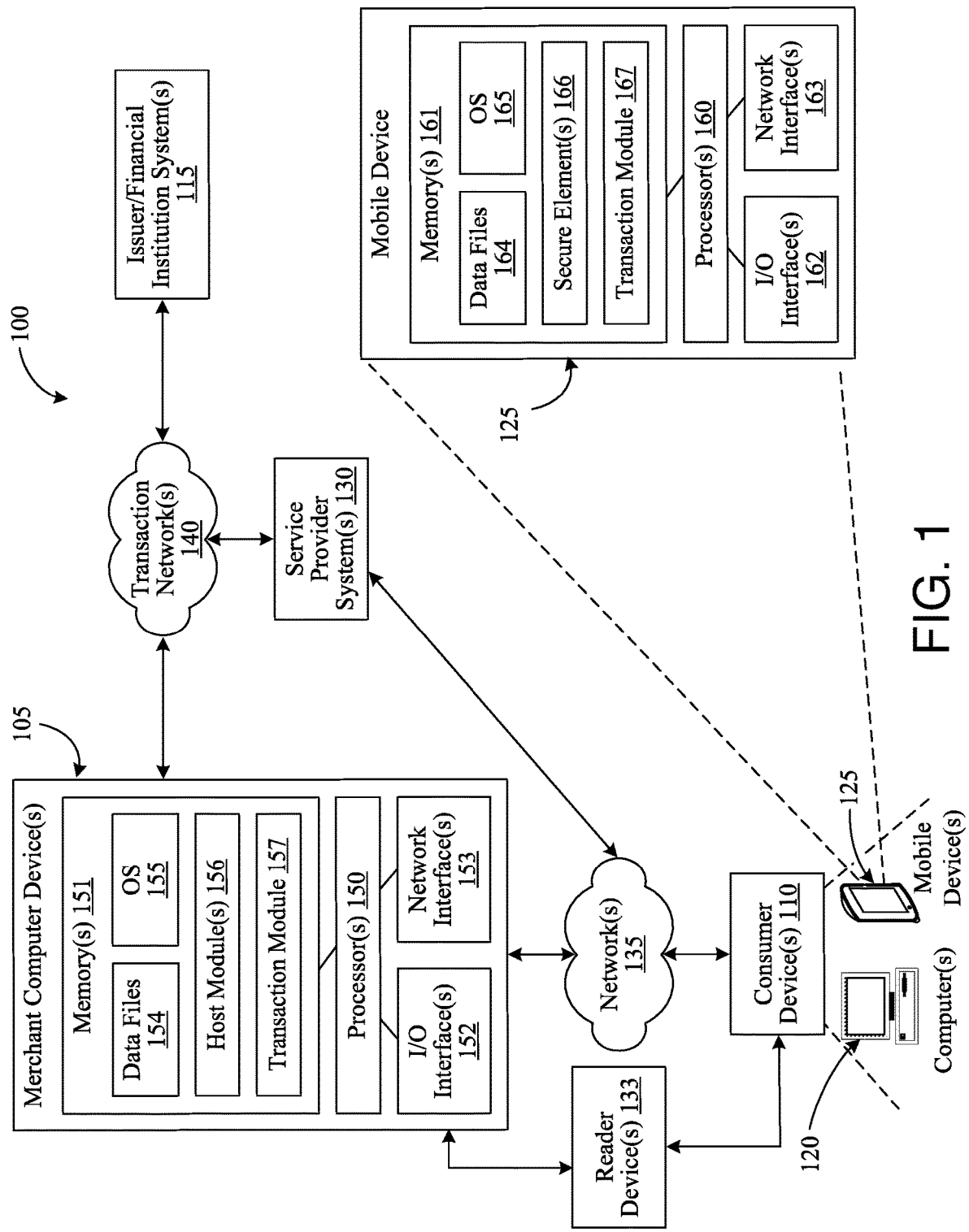
FIG. 1 illustrates a block diagram of an example system that may be utilized in accordance with various embodiments of the disclosure.

Various embodiments of the disclosure are directed to systems and methods for facilitating card present transactions, such as eCommerce transactions and/or transactions at a merchant point-of-sale ("POS"). In certain embodiments, one or more secure payment applications may be provisioned to a consumer device, such as a consumer mobile device, and the one or more applications may facilitate card present transactions. For example, during an online purchase, a consumer may provide a merchant with identification information for a mobile device (e.g., a mobile telephone number, etc.), thereby facilitating communication with the mobile device (e.g., communication by the merchant, communication by a service provider, etc.) in order to obtain card present information, such as payment account information, security information, and/or validation data. Alternatively, the merchant may provide the user with information (e.g., transaction specific information to be entered into a mobile device to facilitate collection of card present information. The use of the card present information may then be provided to a payment account issuer in order to facilitate completion of a card present eCommerce transaction. In this regard, the merchant may receive more favorable transaction processing terms than those associated with typical eCommerce transactions. For example, the merchant may not be charged a card not present fee from an issuer.

In other embodiments, a card present transaction may be completed utilizing a mobile device at a merchant POS. For example, a merchant may utilize any number of reader devices to collect card present information from a mobile device. Alternatively, the merchant may collect contact information associated with a mobile device, and communication with the mobile device may be facilitated in a similar manner as that described above with reference to eCommerce transactions. As yet another alternative, the mobile device may collect merchant information associated with a payment transaction (e.g., merchant identification information, information associated with a particular payment station such as a gas pump or table at a restaurant, location information, etc.), and the mobile device may contact a merchant system and/or a service provider to facilitate completion of a transaction.

In certain embodiments, including eCommerce and POS embodiments, a merchant may initiate a payment transaction that is pushed to the mobile device by a service provider or by the merchant system. For example, a cloud to device message ("C2DM") service or other suitable technique may be utilized to push a transaction message to a mobile device. In this regard, a wallet application on the mobile device may be woken up and/or initiated. The consumer may then utilize the mobile device to review transaction information, approve a payment transaction, provide authentication information, and/or to provide a wide variety of other information associated with a transaction (e.g., shipping preferences, etc.). Additionally, in certain embodiments, a payment request or transaction initiated by a first device (e.g., a personal computer, mobile device, etc.) associated with a first user may result in the communication of transaction-related information to a second device (e.g., a mobile device) associated with a second user. In this regard, the second user may be permitted to approve a payment transaction made by the first user. For example, a parent can review transactions initiated by a child, and the parent can optionally approve payment transactions prior to their completion.

Additionally, in accordance with various embodiments of the disclosure, a consumer may utilize a mobile device to provide a wide variety of authentication information in association with a payment transaction. A card present transaction may request a consumer personal identification number ("PIN") and/or a signature in order to authenticate the transaction. In certain embodiments, a mobile device (e.g., in conjunction with a mobile wallet application and/or requests received from a merchant system and/or a service provider) may prompt the user to enter either a PIN or a signature. As desired, the selection of a PIN or a signature may be based upon a wide variety of different factors, such as a type of payment account being utilized, merchant preferences, and/or consumer preferences. Additionally, in certain embodiments, such as embodiments utilizing a dual-branded (e.g., combination credit and debit account, etc.) payment account, a consumer may be prompted to select between a PIN and a signature.

In certain embodiments, a mobile PIN ("mPIN") may facilitate authentication in conjunction with a payment transaction. For example, during the activation of a payment application and/or during the registration of a payment application or mobile device with a service provider (e.g., a trusted service manager or other service provider that facilitates a wide variety of payment transaction services) and/or a payment account issuer (e.g., a credit card issuer, a debit card issuer, etc.), a consumer (i.e., a user of the mobile device) may be prompted to provide security data, such as an mPIN. The mPIN may be stored on the mobile device, for example, in a secure element of the mobile device. Additionally, the mPIN may be provided to the card issuer (and/or the service provider).

Subsequently, the consumer may utilize a suitable consumer device (e.g., the mobile device, a personal computer, etc.) to request a transaction (e.g., a POS transaction, an eCommerce transaction, etc.). The transaction may be identified as a card present transaction (e.g., by processing mobile device information provided to a merchant system, by the mobile device being utilized to communicate information to a merchant or service provider system, etc.), and a suitable wallet or payment application may then be invoked on the mobile device by the merchant or by a suitable service provider. Validation and/or security information (e.g., the mPIN, an encrypted communication including the mPIN, etc.) may then be received from the mobile device, and the mPIN may be utilized to validate the transaction. As desired, the consumer may be prompted by the mobile device for the mPIN prior to validation information being accessed from the secure element for communication. The validation information may then be submitted by the merchant system (or service provider) to the payment account issuer in conjunction with an authorization request for the eCommerce transaction. In this regard, the validation information may be verified by the issuer utilizing the previously received registration information. As a result, strong dynamic two-factor authorization may be achieved by the issuer. For example, the issuer may be able to verify both that the consumer was able to access the secure element and that the information obtained from the secure element is correct.

Embodiments of the disclosure now will be described more fully hereinafter with reference to the accompanying drawings, in which embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

System Overview

FIG. 1 represents a block diagram of an example system 100 for facilitating card present payment transactions, according to one embodiment of the disclosure. The card present payment transactions may include eCommerce transactions and/or POS transactions. In certain embodiments, the system 100 may facilitate interaction with a consumer mobile device in order to process transactions as card present transactions. As shown in FIG. 1, the system 100 may include one or more merchant computers and/or merchant devices 105, one or more consumer devices 110, and one or more issuer or financial institution systems 115. A wide variety of different types of consumer devices 110 may be provided, such as personal computers 120 and/or mobile devices 125. As desired, the system 100 may include a wide variety of other entities associated with payment transactions, such as one or more service provider systems 130. Additionally, in embodiments that facilitate POS transactions, any number of reader devices 133 may be associated with the merchant computers 105. Any number of suitable networks and/or communication channels, such as the illustrated networks 135, 140, may facilitate communication between various components of the system 100.

With reference to FIG. 1, any number of merchant computers and/or merchant devices 105 may be provided. In certain embodiments, these merchant devices may include one or more eCommerce devices, such as one or more Web servers and/or associated systems that facilitate eCommerce transactions. In other embodiments, these merchant devices may include one or more merchant POS systems. As desired, each merchant device may include any number of processor-driven devices, including but not limited to, a server computer, a mainframe computer, one or more networked computers, a desktop computer, a personal computer, a laptop computer, a mobile computer, an application-specific circuit, or any other processor-based device.

A merchant computer 105 may be any suitable device that facilitates payment transactions. In eCommerce scenarios, the merchant computer 105 may utilize one or more processors 150 to execute computer-readable instructions that facilitate the hosting of one or more eCommerce services (e.g., the hosting of one or more eCommerce Web sites), the receipt of purchase transaction requests, and/or the processing of eCommerce transactions. As a result of executing these computer-readable instructions, a special purpose computer or particular machine may be formed that facilitates the eCommerce transactions, including card present eCommerce transactions. In POS scenarios, the merchant computer 105 may utilize the one or more processors 150 to facilitate a POS payment transaction. For example, the one or more processors 150 may execute computer-readable instructions that facilitate the collection of payment-related information (e.g., account information, authentication information, etc.) from a mobile device 125, and the completion of a payment transaction utilizing collected information. As a result of executing these computer-readable instructions, a special purpose computer or particular machine may be formed that facilitates card present transactions at a POS.

In addition to having one or more processors 150, the merchant computer 105 may further include and/or be associated with one or more memory devices (referred to herein as memory 151), input/output ("I/O") interface(s) 152, and/or network interface(s) 153. The memory 151 may be any computer-readable medium, coupled to the processor(s) 150, such as random access memory ("RAM"), read-only memory ("ROM"), and/or a removable storage device. The memory 151 may store a wide variety of data files 154 and/or various program modules, such as an operating system ("OS") 155, one or more host modules 156, and/or one or more transaction modules or transaction applications 157. The data files 154 may include any suitable data that facilitates the operation of the merchant computer 105 and/or the interaction of the merchant computer 105 with one or more other components (e.g., one or more consumer devices 110, one or more service provider systems 130, one or more merchant acquiring platforms, one or more issuer systems 115, etc.) of the system 100. For example, the data files 154 may include information associated with eCommerce Web pages, one or more reader devices 133, inventory information associated with available products, acquiring platform information, service provider information, information associated with the generation of proposed payment transactions and/or routing information for proposed transactions.

The OS 155 may be a suitable module that facilitates the general operation of the merchant computer 105, as well as the execution of other program modules. For example, the OS 155 may be, but is not limited to, Microsoft Windows®, Apple OSX™, Unix, a mainframe computer operating system (e.g., IBM z/OS, MVS, OS/390, etc.), or a specially designed operating system. The host modules 156 may include any number of suitable host modules that manage interactions and communications between the merchant computer 105 and external devices, such as the consumer devices 110 and/or the reader devices 133. For example, the host modules 156 may include one or more Web server modules that facilitate the hosting of merchant Web pages and/or transaction processing Web pages. As another example, the host modules 156 may include one or more cellular modules and/or systems that facilitate cellular communication with one or more mobile devices 125.

The transaction modules or applications 157 may include any number of suitable software modules and/or applications that facilitate the collection and/or processing of information associated with a payment transaction, such as one or more identifiers of desired products (e.g., UPC identifiers) and/or services, a desired payment account, a desired type of transaction (e.g., a card present transaction, a card not present transaction, etc.), consumer identification information, and/or an identifier of a consumer device 110 (e.g., a mobile device identifier, etc.). Based at least in part upon the collected information, the transaction module 157 may generate and/or communicate a wide variety of transaction-related requests, such as payment processing and/or authorization requests, requests for one or more value added services ("VAS"), and/or requests for transaction approval (e.g., an approval request in a multi-user scenario).

In one example operation, a transaction module 157 may receive a request for a payment transaction (e.g., an eCommerce request provided via a Web page, a POS request, etc.). As desired, the transaction module 157 may identify available payment options that are presented to a consumer (e.g., credit account payment options, debit account payment options, stored value account payment options, card present eCommerce payment options, etc.), and a consumer selection of a payment option may be received. In the event that a card present transaction is requested, the transaction module 157 may obtain a mobile device identifier, for example, via an established communications session with a consumer's mobile device 125 or in response to requesting the mobile device identifier from the consumer. Alternatively, the transaction module 157 may present information (e.g., a transaction-specific code, etc.) that a consumer enters into the mobile device (e.g., enters into a wallet application, etc.) to initiate a card present transaction.

In the event that a mobile device identifier is provided to the transaction module 157, the transaction module 157 may invoke or request that a service provider system 130 invoke one or more suitable applications on the mobile device 125 (e.g., a wallet application, a transaction module, etc.) in order to receive a consumer approval for the transaction. Additionally, the applications may be invoked in order to receive authentication and/or validation information from the mobile device 125, such as a signature, an mPIN, a message (e.g., an encrypted message, etc.) derived from a signature and/or an mPIN, and/or other information (e.g., a secure element identifier, an encryption key, etc.). The transaction module 157 (or service provider system 130) may then associate the validation information with a proposed transaction that is output for communication to an issuer system 115 associated with a selected payment account. For example, the transaction module 157 may append and/or incorporate the validation information into a transaction authorization and/or settlement request. In this regard, the issuer system 115 may verify the validation information and determine whether a card present eCommerce transaction will be allowed.

Alternatively, in the event that presented information, such as a code, is entered into the mobile device 125 by the consumer, the mobile device 125 and/or one or more associated applications (e.g., a wallet application, etc.) may initiate communication with a service provider system 130 (or merchant computer 105) in order to complete and/or authenticate a payment transaction. Transaction approval and/or authentication information may then be received in a similar manner as that set forth above.

As desired, prior to the output of a proposed transaction, the transaction module 157 may invoke and/or request (e.g., request a service provider system 130, etc.) the invocation of a wide variety of VAS associated with a transaction, such as the application of coupons, the award and/or redemption of loyalty rewards, etc. Additionally, in the event that the transaction is authorized, the transaction module 157 may invoke and/or request the invocation of a wide variety of VAS following the transaction, such as receipt delivery services, product registration services, etc. Indeed, a wide variety of suitable operations may be performed by the transaction module 157.

A few examples of the operations that may be performed by a transaction module 157 and/or the merchant computer 105 are described in greater detail below with reference to FIGS. 2 and 4-6.

With continued reference to the merchant computer 105, the one or more I/O interfaces 152 may facilitate communication between the merchant computer 105 and one or more input/output devices; for example, one or more user interface devices, such as a display, a keypad, a mouse, a pointing device, a control panel, a touch screen display, a remote control, a microphone, a speaker, a consumer device reader, etc., that facilitate user interaction with the merchant computer 105. As desired, the I/O interfaces 152 may also facilitate communication with any number of reader devices 133. The one or more network interfaces 153 may facilitate connection of the merchant computer 105 to one or more suitable networks and/or communication links. In this regard, the merchant computer 105 may receive and/or communicate information to other components of the system 100, such as the consumer devices 110, the service provider systems 130, and/or the issuer systems 115.

In embodiments in which a merchant computer 105 is situated at a POS, any number of suitable reader devices 133 may be associated with the merchant computer 105. Examples of suitable reader devices 133 include, but are not limited to, a near field communication reader, a radio frequency reader, a Bluetooth reader, or other suitable reader device. In other embodiments, a mobile device 125 may function as a virtual reader device that collects merchant contextual and payment information associated with a merchant. Thus, even if a suitable merchant reader device (e.g., an NFC reader, an RF reader, etc.) is not located at or associated with a merchant POS device, a transaction may still be facilitated at the point of sale or point of service.

Additionally, with continued reference to FIG. 1, any number of consumer devices 110 may be provided. Examples of suitable consumer devices 110 include, but are not limited to, personal computers 120 and/or mobile devices 125 (e.g., mobile phones, smart phones, etc.). According to an aspect of the disclosure, a consumer device 110 may be a suitable device that is capable of interaction with other components of the system 100 during the request and/or completion of a payment transaction. For example, a personal computer 120 or a mobile device 125 may be utilized to access one or more eCommerce Web sites hosted by the merchant computer 105, identify products and/or services to be purchased, request a purchase transaction, and/or interact with the merchant computer 105 and/or other components of the system 100 (e.g., the service provider systems 130, etc.) during the completion of a purchase transaction. As another example, a mobile device 125 may be utilized to complete a transaction at a POS. In one example embodiment, a mobile device 125 may be utilized to request a card present transaction and/or to provide validation information during the processing of the card present transaction. As desired, the card present transaction may be an eCommerce transaction, a transaction in which the mobile device 125 functions as a virtual reader, and/or a transaction in which the mobile device 125 interacts with one or more reader devices 133 at a POS. In another example embodiment, a personal computer 120 may be utilized to request a card present transaction, such as an eCommerce card present transaction, and communication may be established with a mobile device 125 in order to facilitate provision of validation information.

As desired, a consumer device 110 may include any number of processor-driven devices, including but not limited to, a personal computer, a mobile computer, an application-specific circuit, a minicomputer, a microcontroller, and/or any other processor-based device. The components of an example mobile device 125 will now be described in greater detail, and it will be appreciated that a personal computer 120 may include similar components. With reference to the mobile device 125, the mobile device 125 may utilize one or more processors 160 to execute computer-readable instructions that facilitate the general operation of the mobile device 125 (e.g., call functionality, etc.) and/or communication with a merchant computer 105 and/or other components of the system 100 (e.g., the service provider systems 130) for eCommerce and/or payment transaction purposes. As a result of executing these computer-readable instructions, a special purpose computer or particular machine may be formed that facilitates the completion and/or validation of payment transactions.

In addition to having one or more processors 160, the mobile device 125 may further include and/or be associated with one or more memory devices (referred to herein as memory 161), input/output ("I/O") interface(s) 162, and/or network interface(s) 163. The memory 161 may be any computer-readable medium, coupled to the processor(s) 160, such as random access memory ("RAM"), read-only memory ("ROM"), and/or a removable storage device. The memory 161 may store a wide variety of data files 164 and/or various program modules, such as an operating system ("OS") 165 and/or one or more transaction modules or applications 167. In certain embodiments, a mobile device 125 may include one or more secure elements 166 configured to securely store and/or access information, such as payment applications, payment account information, authentication and/or validation information (e.g., a stored mPIN, etc.), authentication preferences, encryption information, and/or other transaction-related information. The secure elements 166 may be stored in the memory 161 and/or included as a separate component of the mobile device 125. For example, a secure element 166 may be a separate chip that is configured to communicate with primary computing functionality for the mobile device 125. As desired, one or more of the transaction modules 167 may be stored on a secure element 166. These transaction modules 167 may be invoked by other components of the mobile device 125 and/or by one or more other components of the system 100, such as the merchant computer 105 and/or the service provider systems 130. In one example embodiment, transaction modules associated with various payment accounts may be stored on the secure element 166, and a transaction module that functions as a wallet application may be stored in the memory 161. The wallet application may then invoke and/or communicate with the payment account transaction modules.

The data files 164 may include any suitable data that facilitates the operation of the mobile device 125 and/or the interaction of the mobile device 125 with one or more other components (e.g., a merchant computer 105, a service provider system 130, etc.) of the system 100. For example, the data files 164 may include information associated with accessing the secure elements 166, information associated with invoking transaction modules 167, and/or information associated with collecting, accessing, and/or processing validation data (e.g., an mPIN, a signature, etc.). The OS 165 may be a suitable module that facilitates the general operation of the mobile device 125, as well as the execution of other program modules. For example, the OS 165 may be, but is not limited to, a suitable mobile OS or a specially designed operating system. As desired, the mobile device 125 may also include one or more suitable browser applications that facilitate the access of one or more Web pages hosted by the merchant computer 105.

The transaction modules 167 may include one or more suitable software modules and/or applications configured to facilitate payment transactions, such as card present transactions, on behalf of the mobile device 125. In certain embodiments, a transaction module 167 may also facilitate communication with a service provider system 130, such as a trusted service manager, and/or communication with a merchant computer 105 or merchant system. A wide variety of suitable techniques may be utilized to install a transaction module 167 on the mobile device 125. For example, a transaction module 167 may be provisioned to the mobile device 125 by a service provider system 130 and/or by an issuer system 115. Additionally, as desired, during the installation and/or registration of the transaction module 167, a wide variety of validation information may be generated and/or identified. For example, the consumer may be prompted to enter an mPIN, such as a multi-character and/or multi-numeral code. As desired, the mPIN may be stored on a secure element 166. Additionally, the mPIN and/or a wide variety of information derived from the mPIN (e.g., an encrypted mPIN, etc.) may be provided to one or more issuer systems 115, such as an issuer system 115 associated with an issuer of a payment account (e.g., a credit account, a debit account, a stored value account, etc.) that is associated with the transaction module 167. As desired, a wide variety of transaction processing parameters may be stored in association with the transaction module, such as validation and/or authentication preferences (e.g., signature and/or PIN preferences, etc.), transaction approval preferences, multi-user approval preferences, and/or preferences associated with various value added services.

According to an aspect of the disclosure, following registration and/or activation of the transaction module 167, the transaction module 167 may be invoked during a payment transaction. For example, the transaction module 167 may be invoked by a merchant computer 105 or by a service provider system 130 at the request of the merchant computer 105. In certain embodiments, the transaction module 167 may be invoked following a consumer request to conduct a card present transaction and the identification of the mobile device 125 by the merchant computer 105 (or service provider system 130). Alternatively, in other embodiments, the transaction module 167 may contact a merchant system or a service provider system 130 in order to initiate a payment transaction. For example, a user may enter a transaction-specific code or other information into the mobile device 125, and the transaction module 167 may provide the transaction-specific code to a merchant computer 105 or a service provider system 130 in association with a transaction request. As another example, the mobile device 125 may function as a virtual reader that collects transaction and/or merchant information, and the transaction module 167 may utilize at least a portion of the collected information to communicate with a merchant and/or service provider system to initiate a payment transaction.

In certain embodiments, following the invocation of the transaction module 167 (or the initiation of a payment transaction by the transaction module 167), a request for validation data (e.g., a signature, a PIN, an mPIN, etc.) and/or payment account data may be received by the transaction module 167. For example, a request may be received from a merchant computer 105 and/or a service provider system 130. As desired, a type of requested validation data (e.g., a PIN or a signature) may be based upon a wide variety of different factors, such as a type of payment account being utilized (e.g., a debit account, a credit account, etc.), parameters associated with the payment account, merchant preferences, and/or consumer preferences. Additionally, in certain embodiments, such as embodiments utilizing a dual-branded (e.g., combination credit and debit account, etc.) payment account, a consumer may be prompted to select between a PIN and a signature.

As desired, the transaction module 167 may prompt the consumer for entry of validation data, such as a signature and/or an mPIN, and the customer may enter the requested information via any suitable I/O devices, such as a keypad, a touch screen, etc. As desired, stored validation data may be accessed from the secure element 166 and compared to the entered information. For example, a stored mPIN value may be accessed from the secure element 166 and compared to an entered mPIN value. In this regard, the mobile device 125 and/or the transaction module 167 may validate the validation information. If entered information is not authenticated, then the transaction module 167 may reject a proposed transaction and direct the output of a suitable error message.

If, however, the entered validation information is authenticated by the mobile device 125, then the transaction module 167 may provide payment account data and associated validation data to the merchant computer 105 (or a service provider system 130). A wide variety of different types of validation data may be provided as desired in various embodiments including, but not limited to, a signature, an mPIN entered by the consumer, an indication that the entered mPIN was authenticated by the mobile device 125 and/or the secure element 166, an encrypted version of the entered mPIN, and/or an encrypted version of the stored mPIN. In one example embodiment, an entered mPIN may be authenticated, encrypted, and provided to the merchant computer 105 (or a service provider system 130). In this regard, the encrypted mPIN may be provided to the issuer system 115 for authentication and/or risk analysis purposes.

Additionally, in certain embodiments, the transaction module 167 may facilitate consumer approval of any number of proposed payment transactions. For example, a merchant computer 105 may initiate a payment transaction (e.g., a POS transaction, an eCommerce transaction, etc.) that is pushed to the mobile device by the service provider system 130 or by a merchant system. For example, a cloud to device message ("C2DM") service or other suitable technique may be utilized to push a transaction message to a mobile device 125. In this regard, a transaction module 167 on the mobile device may be woken up and/or initiated. The consumer may then utilize the mobile device 125 to review transaction information, approve a payment transaction, provide authentication information, and/or to provide a wide variety of other information associated with a transaction (e.g., shipping information, requests for electronic and/or paper receipts, requests for protection plans and/or warranties, various VAS information, etc.). As another example, in certain embodiments, a payment request or transaction initiated by a first device (e.g., a personal computer, a first mobile device, etc.) associated with a first user may result in the communication of transaction-related information to a second device (e.g., a mobile device) associated with a second user. In this regard, the second user may be permitted to review and/or approve a payment transaction made by the first user. For example, a parent can review transactions initiated by a child, and the parent can optionally approve payments transactions prior to their completion.

A few examples of the operations of the transaction module 167 and/or the mobile device 125 are described in greater detail below with reference to FIGS. 3-6.

The one or more I/O interfaces 162 may facilitate communication between the mobile device 125 and one or more input/output devices; for example, one or more user interface devices, such as a display, a keypad, a touch screen display, a microphone, a speaker, etc., that facilitate user interaction with the mobile device 125. The one or more network interfaces 163 may facilitate connection of the mobile device 125 to one or more suitable networks, for example, the network(s) 135 illustrated in FIG. 1. In this regard, the mobile device 125 may receive and/or communicate information to other components of the system 100.

With continued reference to FIG. 1, as desired in various embodiments, any number of issuer and/or financial institution systems 115 may be provided. An issuer system 115 may facilitate the backend processing of a proposed transaction, such as a proposed card present transaction. For example, an issuer system 115 may facilitate the approval, authentication, and/or settlement of a proposed transaction. In certain embodiments, a proposed transaction may be routed to an issuer system 115 via a suitable transaction network 140 (e.g., a debit network, a credit network, etc.), and the issuer system 115 may evaluate the proposed transaction. An approval or rejection of the proposed transaction may then be output for communication to a merchant computer 105. The issuer system 115 may then facilitate the settlement of the proposed transaction. In certain embodiments, an issuer system 115 may include similar components as those discussed above for the merchant computer 105. For example, an issuer system 115 may include any number of processors, memories, I/O interfaces, and/or network interfaces.

According to an aspect of the disclosure, an issuer system 115 may receive validation information in association with a proposed eCommerce transaction. For example, the issuer system 115 may receive an encrypted mPIN (or signature) and/or data derived from an mPIN (e.g., a dynamic hash of the mPIN, etc.). In other words, the mPIN may not be communicated in the clear to the issuer system 115. The issuer system 115 may compare at least a portion of the received validation information to information previously stored by the issuer system 115, such as an mPIN stored during the registration and/or activation of a transaction module 167. In this regard, the issuer system 115 may determine whether to authenticate a proposed transaction and/or whether to permit the proposed transaction to be processed as a card present transaction. In certain embodiments, the evaluation of received validation information may determine both that a correct mPIN was entered by a consumer and validated by the secure element 166 and that correct validation information (e.g., an encrypted mPIN) was output by the mobile device 125. In this regard, strong dynamic two-factor authentication may be performed by the issuer system 115. This authentication may provide comparable security to that provided at brick-and-mortar or physical merchant locations. Additionally, in certain embodiments, this authentication can be reused for a wide variety of Federated Authentication purposes.

With continued reference to FIG. 1, any number of service provider systems 130 and/or service provider computers may be utilized as desired in various embodiments of the disclosure. As desired, a service provider system 130 may provide a wide variety of transaction module provisioning services. For example, the service provider system 130 may push transaction approval requests, including requests initiated by a merchant system and/or requests associated with a multi-user scenario, to a mobile device 125. A wide variety of suitable types of messages and/or requests may be communicated as desired, such as C2DM service requests. In certain embodiments, a pushed request may facilitate initiation of a transaction module 167 (e.g., a wallet application, etc.) on the mobile device 125. For example, a request may activate a wallet application. As another example, selection of a message or request by the consumer may result in the launching of the wallet application. As a result of pushing requests to a mobile device 125, a consumer may approve proposed payment transactions and/or utilize the mobile device 125 to provide validation and/or authentication information.

Additionally, a service provider system 130 may provide a wide variety of transaction-related and/or value added services ("VAS") in association with transactions, such as coupon redemption services, loyalty services, location-based services, electronic receipt services, product registration services, warranty services, coupon issuance services, and/or the routing of a proposed transaction to an issuer for approval and/or settlement purposes. In certain embodiments, a service provider system 130 may include similar components as those discussed above for the merchant computer 105. For example, a service provider system 130 may include any number of processors, memories, I/O interfaces, and/or network interfaces.

A wide variety of suitable networks 135, 140 may be utilized in association with embodiments of the disclosure. Certain networks 135 may facilitate a wide variety of POS and/or eCommerce-related communication. For example, one or more telecommunication networks, cellular networks, wide area networks (e.g., the Internet), local area networks, Wi-Fi enabled networks, Bluetooth-enabled networks, and/or other networks may be provided. Other networks may facilitate transaction-related communications. For example, one or more transaction networks 140, such as branded networks (e.g., a VISA network, etc.), debit and/or PIN networks, and/or a wide variety of other suitable transaction networks may facilitate communication of transaction-related communications, such as proposed transactions. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionalities described with respect to the system components shown in FIG. 1. Accordingly, embodiments of the disclosure should not be construed as being limited to any particular operating environment, system architecture, or device configuration.

Operational Overview

Figure 2:
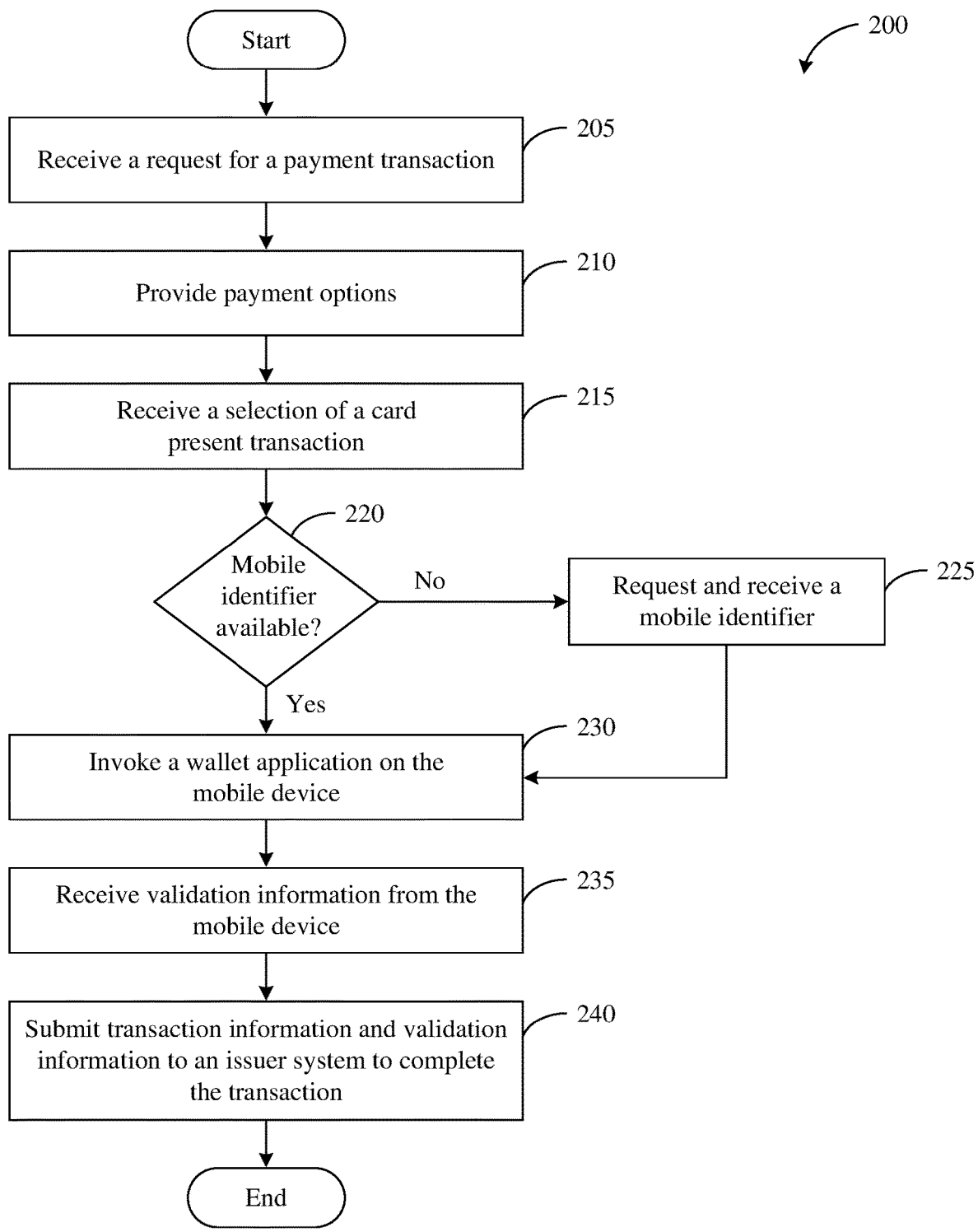
FIG. 2 illustrates a flow diagram of an example process for facilitating a card present transaction at a merchant system, according to example embodiments of the disclosure.

FIG. 2 illustrates a flow diagram of an example method 200 for facilitating a card present transaction at a merchant system, according to example embodiments of the disclosure. In certain embodiments, the operations of the method 200 may be performed by a suitable merchant computer, such as the merchant computer 105 illustrated in FIG. 1. The method 200 may begin at block 205.

At block 205, a request for a payment transaction, such as an eCommerce transaction, may be received. For example, a consumer may utilize a consumer device 110, such as a personal computer 120 or a mobile device 125, to navigate through one or more Web pages associated with the merchant computer 105, and the consumer may select one or more products and/or services to purchase. The consumer may then select an available option for requesting an eCommerce transaction. For example, the consumer may select a suitable "checkout" option provided by the one or more Web pages. Although an eCommerce transaction is described in FIG. 2, various operations of the method 200 may be utilized in conjunction with POS transactions.

At block 210, one or more payment options may be identified by the merchant computer 105 and provided or communicated to the consumer device 110 for presentation to the consumer. A wide variety of suitable payment options may be identified and provided as desired in various embodiments of the disclosure, such as indications of supported payment networks (e.g., credit networks, debit networks, etc.) and/or indications of supported payment devices and/or payment accounts (e.g., credit accounts, debit accounts, stored value accounts, etc.). According to an aspect of the disclosure, at least one option for a card present payment may be identified and provided. For example, an option to utilize a mobile device 125 and/or an associated transaction module 167 to complete a card present eCommerce transaction may be identified and provided.

At block 215, a consumer selection of a desired payment option may be received from the consumer device 110. According to an aspect of the disclosure, the consumer selection may be a selection for a card present transaction. At block 220, a determination may be made as to whether a mobile device identifier, such as a telephone number of a mobile device 125, is available. In embodiments in which the consumer utilizes a mobile device 125 to request an eCommerce transaction, a mobile device identifier may be pulled from the mobile device 125. For example, a mobile device identifier may be pulled if the user is utilizing a browser application or other application (e.g., a dedicated merchant application, etc.) to shop with the mobile device 125. In embodiments in which the consumer utilizes another consumer device 110, such as a personal computer 120 to request an eCommerce transaction, a request for a mobile device identifier may be communicated to the consumer device 110, and the mobile device identifier may be received in response to the request. If it is determined at block 220 that a mobile device identifier is not available, then operations may continue at block 225, and a request for a mobile device identifier may be communicated to the consumer device 110. For example, a suitable Web page or other graphical user interface may prompt the consumer to enter a mobile telephone number in order to complete a card present transaction. The mobile device identifier may then be received in response to the request, and operations may continue at block 230. If, however, it is determined at block 220 that a mobile device identifier is available, then operations may continue at block 230.

As an alternative to requesting a mobile device identifier, as explained in greater detail below with reference to FIG. 4, a transaction-specific code (or other identifier) may be output for presentation to the consumer. In certain embodiments, the transaction-specific code may also be communicated to a service provider system 130. The consumer may enter the transaction-specific code into the mobile device 125, and a transaction module 167 may communicate the code to the service provider system 130 in order to initiate a payment transaction.

At block 230, which may be reached from either block 220 or block 225, a suitable wallet application or transaction module may be invoked on the mobile device 125. For example, a transaction module associated with a desired payment account may be invoked. In certain embodiments, the merchant computer 105 may invoke the transaction module. In other embodiments, the merchant computer 105 may direct or request another device or system, such as a suitable service provider system 130, to invoke the transaction module. During the invocation of the transaction module, a wide variety of different types of validation information may be requested from the mobile device 125, such as a signature or a value derived from an mPIN (e.g., an encrypted mPIN, a dynamic hash value derived from an mPIN, etc.).

At block 235, validation information and payment account information may be received from the mobile device 125. The received information may then be utilized at block 240 to generate and/or submit a proposed transaction to an issuer system, such as the issuer system 115 illustrated in FIG. 1. In certain embodiments, a wide variety of transaction-related information, such as a purchase amount, payment account information, a request for a card present transaction, and/or validation information may be included in a proposed transaction. Additionally, in certain embodiments, a proposed transaction or a transaction request may be routed to an issuer system 115 via one or more other systems, such as a service provider system 130 or a merchant acquiring platform. Further, in certain embodiments, one or more requests for VAS may be generated by the merchant computer 105 and communicated to a service provider system 130 for processing.

The method 200 may end following block 240.

Figure 3:
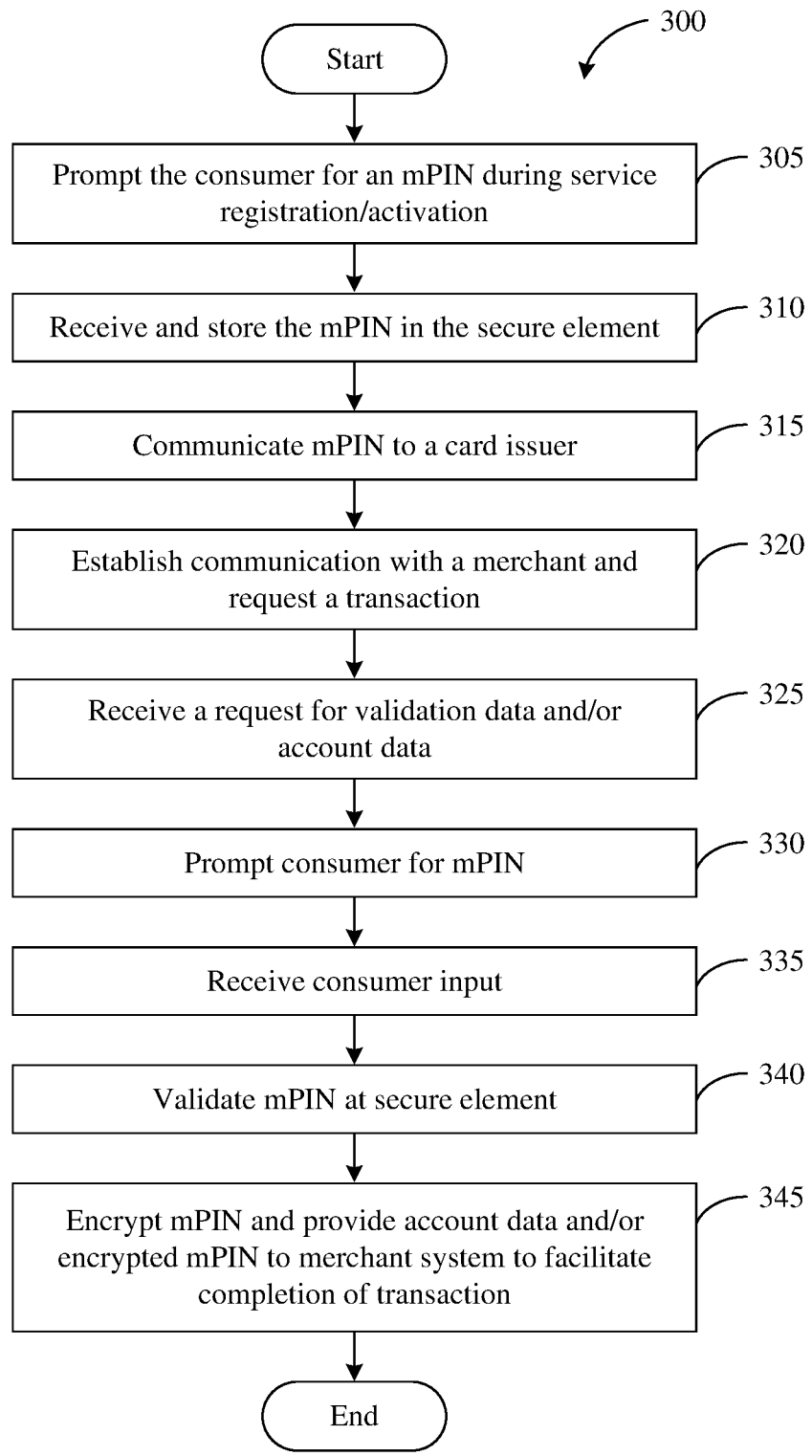
FIG. 3 illustrates a flow diagram of an example process for completing a card present transaction utilizing a consumer device, according to example embodiments of the disclosure.

FIG. 3 illustrates a flow diagram of an example method 300 for completing a card present transaction utilizing a consumer device, according to an example embodiment of the disclosure. In certain embodiments, the operations of the method 300 may be performed by one or more suitable consumer devices, such as the consumer devices 110 illustrated in FIG. 1. The method 300 may begin at block 305.

At block 305, a payment application or other suitable transaction-related application may be provided to a mobile device of a consumer, such as the mobile device 125 illustrated in FIG. 1. For example, a payment application or mobile wallet application may be provisioned to the mobile device 125 by a payment account issuer (e.g., an issuer of a payment account associated with the application, etc.), a trusted service manager, or another suitable service provider. As desired, the application may be stored on a secure element of the mobile device 125. Additionally, the application may be activated and/or registered by the mobile device 125 in order to facilitate use of the application in subsequent transactions, such as subsequent card present transactions. For example, the application may be registered with a payment account issuer or with another service provider.

During the registration, the consumer may be prompted to enter or otherwise provide security and/or validation information, such as an mPIN. At block 310, an mPIN (and/or other security information) may be entered by the consumer and received by the mobile device 125. In certain embodiments, the received mPIN may be stored in a secure element of the mobile device 125 for use in subsequent transaction authentications. Additionally, at block 315, the mPIN and/or a value derived from the mPIN (e.g., an encrypted mPIN, a dynamic hash of the mPIN, etc.) may be output by the mobile device 125 for communication to one or more payment account issuers associated with the payment application. In this regard, an issuer may store the mPIN-related information for use in subsequent transaction authentications.

At block 320, the consumer may utilize a suitable consumer device 110, such as the mobile device 125, a personal computer 120, or another consumer device, to establish communication with a merchant Web site and to request a transaction. For example, a consumer device 110 may be utilized to navigate one or more Web pages hosted by a merchant computer 105, to select products and/or services to be purchased, and to request a purchase transaction associated with the selected items. As explained in greater detail above with reference to FIG. 2, the consumer may request a card present transaction, and identification information for the mobile device 125 may be identified by the merchant computer 105 in association with the requested card present transaction. Alternatively, a consumer may utilize a mobile device 125 in association with a requested transaction (e.g., a checkout transaction) at a POS.

Although payment transactions have been described above as purchase transaction (e.g., eCommerce transactions, POS transactions, etc.), a wide variety of other types of payment transactions may be initiated and/or utilized. For example, a consumer may utilize a consumer device 110 to receive and/or access a wide variety of bill presentment and/or other billing information, and the consumer may request a payment in conjunction with a bill or bill presentment. In one example embodiment, bill presentment information may be received via a wide variety of suitable techniques, such as short message service ("SMS") messaging (e.g., a text message asking the consumer to pay a bill, etc.), delivery via a Web page or other Internet-based communication, and/or delivery via a dedicated application (e.g., an application associated with a biller, etc.). In conjunction with a bill presentment, the consumer may request payment of an outstanding bill be made. In this regard, the shopping experience described above may be replaced with a bill presentment experience. Additionally, a payment may be made utilizing the same or similar payment network(s) as those described for a shopping experience.

At block 325, the payment application stored on the mobile device 125 may be invoked, and a request for validation data and/or payment account data may be received. For example, the payment application may be invoked by the merchant computer 105 or by a suitable service provider system 130. Based at least in part upon the received request for validation data, at block 330, the mobile device 125 may prompt the consumer to enter an mPIN. The consumer may utilize one or more suitable input devices associated with the mobile device 125 (e.g., a touchpad, a touch screen, etc.) to enter an mPIN, and the received consumer input for the mPIN may be received by the mobile device 125 at block 335. Additionally, the consumer may be provided with transaction-related details, and the consumer may be requested to approve the transaction.

At block 340, the received or entered mPIN may be validated by the mobile device 125. For example, the received mPIN may be compared to an mPIN value stored on a secure element of the mobile device 125. In the event that a correspondence is identified, the received mPIN may be validated by the mobile device 125 and/or the secure element. Accordingly, the mobile device 125 may determine that the consumer is authorized to request a card present payment transaction utilizing the payment application.

At block 345, validation information to be output may be prepared by the mobile device 125 and/or secure element. For example, an encrypted mPIN, a dynamic hash value derived from the mPIN, and/or another value derived from the mPIN may be prepared. The validation information and payment account data may then be provided to the merchant computer 105 (or a service provider system) in order to facilitate completion of a card present transaction. In this regard, a proposed transaction or a transaction request may be routed to an issuer system 115 at the request of the merchant computer 105 or one or more other systems, such as a service provider system. According to an aspect of the disclosure, the proposed transaction may include or otherwise be associated with the validation information output by the mobile device 125.

An issuer to which the proposed transaction is communicated may compare at least a portion of the validation information to information previously stored by the issuer, such as an mPIN stored during the registration and/or activation of a payment application. In this regard, the issuer may determine whether to authenticate a proposed card present eCommerce transaction. In certain embodiments, the evaluation of received validation information may determine both that a correct mPIN was entered by a consumer and validated by the secure element and that correct validation information (e.g., an encrypted mPIN) was output by the mobile device 125. In this regard, strong dynamic two-factor authentication may be performed by the issuer.

The method 300 may end following block 345.

Figure 4:
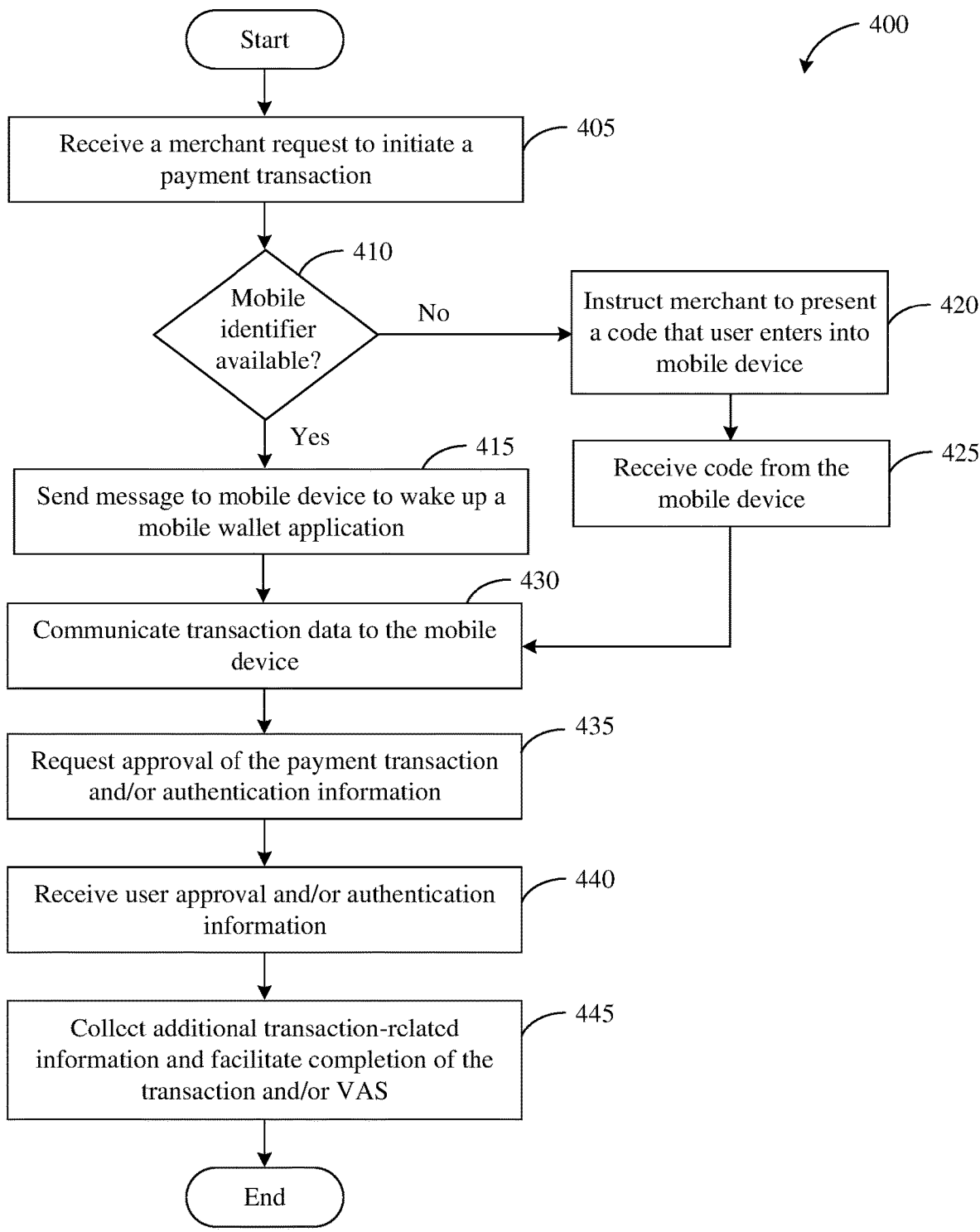
FIG. 4 illustrates a flow diagram of an example process for facilitating a merchant-initiated card present transaction by a service provider, according to example embodiments of the disclosure.

FIG. 4 illustrates a flow diagram of an example method 400 for facilitating a merchant-initiated card present transaction by a service provider, according to example embodiments of the disclosure. Various operations of the method 400 may be performed by components of the system 100 illustrated in FIG. 1. In one embodiment, the operations of the method 400 may be performed by a suitable service provider system 130. In other embodiments, certain operations may be performed by a merchant computer 105 and/or by a combination of a merchant computer 105 and a service provider system 130. The method 400 may begin at block 405.

At block 405, a request to initiate a payment transaction may be received. In one example embodiment, a request to initiate a payment transaction may be received by a service provider system 130 from a merchant computer 105. The request may include a wide variety of information associated with the payment transaction, such as identification information for a mobile device 125, identification information for a consumer, payment account information, and/or a transaction amount.

At block 410, a determination may be made as to whether a mobile identifier (i.e., a phone number or other identifier of a mobile device 125 associated with a consumer) is available. For example, a determination may be made as to whether a mobile identifier is included in the request received from the merchant computer 105. In certain embodiments, the merchant computer 105 may obtain the mobile identifier based upon interaction between the mobile computer 105 and the mobile device 125 (e.g., communication with a mobile device browser during an eCommerce environment, communication with a dedicated application on the mobile device 125, communication with the mobile device 125 at a POS, etc.). In other embodiments, the merchant computer 105 may prompt a consumer to provide a mobile device identifier, and the merchant computer 105 may communicate received information to the service provider computer. As another example of determining whether a mobile identifier is available, a determination may be made as to whether a stored mobile identifier is available. For example, consumer identification information (e.g., a consumer name, etc.) and/or payment account information (if available) may be utilized to access a database (or to send a data request to a remote data source) including mobile identifiers, and a determination may be made as to whether a mobile identifier is available for the proposed payment transaction.

If it is determined at block 410 that a mobile identifier is available, then operations may continue at block 415. At block 415, a message may be communicated to the mobile device 125 in order to facilitate waking up, initiating, and/or launching a mobile wallet application (and/or a payment account application) associated with the mobile device 125. A wide variety of different types of messages may be communicated to the mobile device 125 as desired in various embodiments. Additionally, a wide variety of suitable communication techniques may be utilized, such as various messaging services, short message service ("SMS") messaging, email, etc. In one example embodiment, a C2DM service message (or other suitable push message notification) may be communicated to the mobile device 125. In certain embodiments, a C2DM service message may automatically wake up or launch a wallet application. In other embodiments, the notification may be presented to a consumer (i.e., a user of the mobile device 125), and selection of the message or selection of a link included in the message may facilitate the waking up or launching of the wallet application. Once the wallet application has been activated, communication may be established between the service provider system 130 and the wallet application, and operations may continue at block 430 below.

If, however, it is determined at block 410 that a mobile identifier is not available, then operations may continue at block 420. At block 420, a message may be communicated to the merchant computer 105 instructing the merchant computer to output or present a code (or other transaction-specific information) that the consumer may enter into the mobile device 125 utilizing the mobile wallet application. In other embodiments, the merchant computer 105 may output or present a code without being instructed or prompted to do so. As a result of a code being entered into a mobile device 125, the mobile device 125 (and an associated mobile wallet application) may initiate communication with the service provider system 130, and additional security may be provided for the mobile identifier. For example, the spamming of mobile identifiers entered via a Web site or other network connection may be prevented. Alternatively, if it is determined at block 410 that a mobile identifier is not available, then a request for the mobile identifier may be communicated to the merchant computer 105, and the merchant computer 105 may prompt the consumer to enter a mobile identifier. An entered mobile identifier may then be communicated to the service provider system 130 and utilized to invoke the mobile wallet application.

At block 425, a code may be received from the mobile device 125. For example, a code output by the merchant computer 105 may be entered into the mobile device 125 by a consumer, and the code may be communicated by the mobile device 125 to the service provider system 130. As desired, the code may be encrypted and/or otherwise modified before communication and receipt by the service provider system 130. The received code may be compared to one or more codes received from the merchant computer 105 in order to identify a relevant payment transaction. In this regard, information associated with the payment transaction (e.g., a payment amount, information associated with desired VAS, etc.) may be accessed and/or identified. Operations may then continue at block 430.

At block 430, which may be reached from either block 415 or block 425, a wide variety of suitable transaction data may be communicated to the mobile device 125. Examples of suitable transaction data include, but are not limited to, a payment amount, information associated with purchased items and/or services, information associated with the merchant, and/or information associated with one or more VAS. Additionally, at block 435, approval of the payment transaction and/or authentication information (e.g., a signature, a PIN, an mPIN, etc.) associated with the consumer and/or a payment account may be requested. In this regard, a consumer may review a payment transaction utilizing a mobile device 125, and the consumer may approve the payment transaction. For example, a consumer may participate in an eCommerce transaction or a POS transaction, and the consumer may then utilize his/her mobile device 125 to review and/or approve the payment transaction. In certain embodiments, as described in greater detail below with reference to FIG. 6, a consumer may approve a payment transaction made by another consumer in a multi-user scenario. Additionally, as described in greater detail below with reference to FIG. 5, a consumer may utilize the mobile device 125 to provide a wide variety of different types of authentication and/or validation information associated with a payment account, mobile wallet application, and/or the mobile device 125. As desired in certain embodiments, the consumer may also provide a wide variety of information associated with desired VAS and/or VAS preferences. For example, the consumer may provide information associated with desired shipping preferences, electronic receipt preferences, warranty preferences, etc.

At block 440, user approval and/or authentication information may be received from the mobile device 125. The received approval and/or authentication information may then be processed at block 445 in order to facilitate completion of the transaction. For example, transaction and authentication information may be communicated to an issuer system 115 to facilitate completion of the transaction. Additionally, a wide variety of additional transaction-related and/or VAS information may be collected and/or identified. The additional transaction-related and/or VAS information may then be utilized to facilitate completion of a wide variety of suitable VAS associated with the payment transaction including, but not limited to, the application of coupons, the award and/or redemption of loyalty rewards, the delivery of receipts, product registration services, warranty services, and/or shipping services.

The method 400 may end following block 445.

The method 400 of FIG. 4 describes the processing of a purchase payment transaction; however, various operations of the method 400 may be applicable to other types of transactions. For example, notifications associated with bills and/or bill presentment information may be pushed to a mobile device 125 by a biller or a service provider system. A consumer may then review the billing notice and complete a payment transaction associated with a bill.

Figure 5:
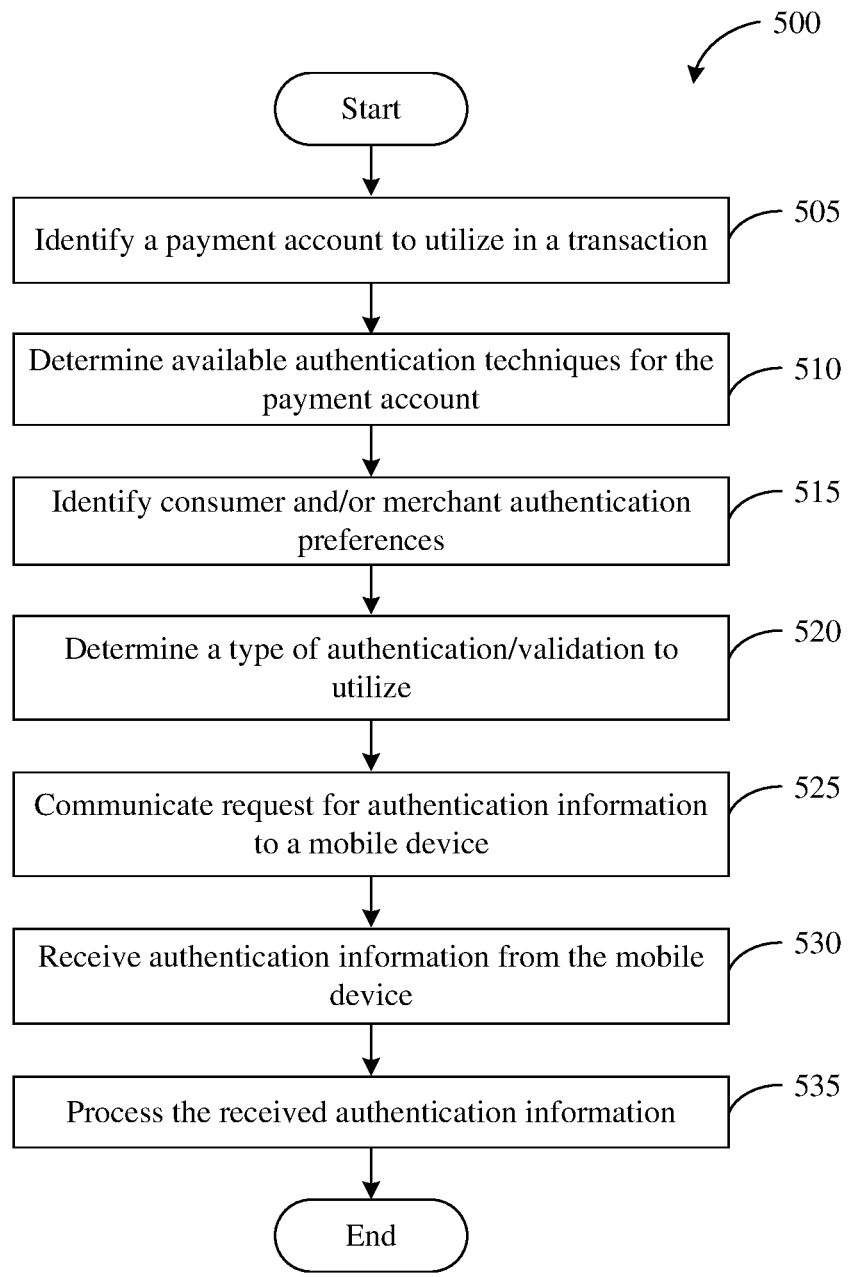
FIG. 5 illustrates a flow diagram of an example process for collecting authentication data associated with a card present transaction, according to example embodiments of the disclosure.

FIG. 5 illustrates a flow diagram of an example method 500 for collecting authentication data associated with a card present transaction, according to example embodiments of the disclosure. Because many card present transactions are PIN or signature-based, the method 500 may facilitate the collection of authentication data from a mobile device 125. Various operations of the method 500 may be performed by components of the system 100 illustrated in FIG. 1. In one embodiment, the operations of the method 500 may be performed by a suitable service provider system 130, for example, based upon a payment transaction request received from a merchant computer 105. In other embodiments, certain operations may be performed by a merchant computer 105 and/or by a combination of a merchant computer 105 and a service provider system 130. The method 500 may begin at block 505.

At block 505, a payment account to be utilized in a payment transaction may be identified. For example, payment account identification information (e.g., an account number, an identifier that is representative of the account, etc.) may be received from a merchant computer 105 and/or a mobile device 125, and the payment account identification information may be utilized to identify the payment account. A wide variety of different types of payment accounts may be identified as desired including, but not limited to, credit accounts, debit accounts, and/or stored value accounts. At block 510, one or more available authentication techniques may be identified based at least in part upon the identified payment account and/or an associated account type. For example, if the identified payment account is a credit account, then signature authentication may be identified as an available authentication technique; if the identified payment account is a debit account, then PIN (or mPIN) authentication may be identified as an available authentication technique; and if the payment account is a dual-branded account, then both signature and PIN authentication may be identified as available authentication techniques. Indeed, a wide variety of different types of available authentication techniques may be identified as desired.

At block 515, in certain embodiments, one or more authentication preferences associated with selecting an available authentication technique may be identified and evaluated. A wide variety of suitable preferences may be identified, such as consumer preferences (e.g., preferences stored at the service provider, preferences stored on a mobile device 125, preferences received from a mobile device 125, etc.) and/or merchant preferences. At block 520, a type of authentication or validation to utilize for the payment transaction may be determined. For example, a type of authentication may be determined based upon an evaluation of available authentication techniques and/or an evaluation of authentication preferences.

In certain embodiments, a service provider system 130 (or merchant computer 105) may determine a type of authentication and/or validation to utilize in association with a payment transaction. For example, the service provider system 130 may evaluate an account and/or account type, and the service provider system 130 may determine a type of authentication. In other embodiments, a mobile device 125 may make the determination. For example, a mobile wallet application may determine a type of authentication based upon a selection of a payment account and/or activation of a payment application associated with a payment account. In yet other embodiments, a consumer may be prompted to select from available authentication types. For example, with a dual-branded account, a consumer may be prompted to select a type of authentication. Alternatively, stored preferences may select the type of authentication. In certain embodiments, selection of an authentication type may select a type of transaction network (e.g., a debit network, a credit network, etc.) utilized in association with the dual-branded account.

At block 525, a request for authentication and/or validation information may be communicated to the mobile device 125 (or output if the mobile device 125 determines the type of desired authentication information). For example, a consumer may be prompted to provide a signature or to enter a PIN value. Once entered by the consumer, the authentication information may be communicated to the service provider system 130 (or merchant computer 105) and received at block 530. The authentication information may then be utilized at block 535 during the processing and completion of the payment transaction.

The method 500 may end following block 535.

Figure 6:
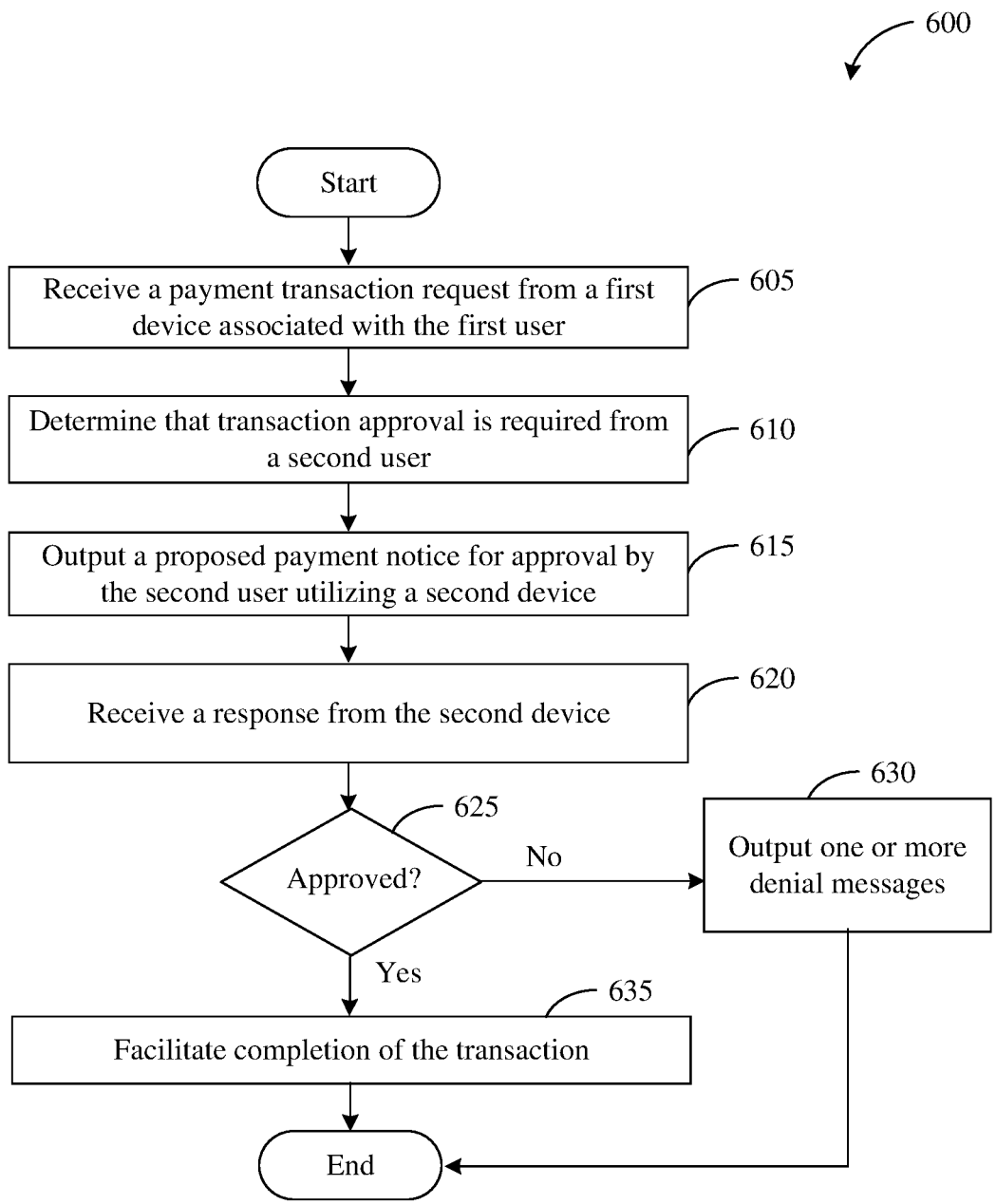
FIG. 6 illustrates a flow diagram of an example process for completing a multi-user payment transaction, according to example embodiments of the disclosure.

FIG. 6 illustrates a flow diagram of an example method 600 for completing a multi-user payment transaction, according to example embodiments of the disclosure. In this regard, a payment transaction initiated by a first user may be reviewed and/or approved by a second user. For example, a parent may review and approve transactions initiated by one or more children. Various operations of the method 600 may be performed by components of the system 100 illustrated in FIG. 1. In one embodiment, the operations of the method 600 may be performed by a suitable service provider system 130. In other embodiments, certain operations may be performed by a merchant computer 105 and/or by a combination of a merchant computer 105 and a service provider system 130. The method 600 may begin at block 605.

At block 605, a payment transaction request may be received from a first device associated with a first user. For example, the first user may utilize a personal computer or a mobile device to initiate or request a purchase transaction at a POS or as an eCommerce transaction. At block 610, information associated with the payment transaction request may be evaluated in order to determine that review and/or approval from a second user should be solicited. At block 615, a proposed payment notice may be output for communication to a second device associated with the second user. In this regard, the second user may be permitted to review information associated with the payment transaction (e.g., a transaction amount, purchased items and/or services, merchant identification information, etc.) and, as desired, the second user may approve or deny the payment transaction.

A wide variety of suitable methods and/or techniques may be utilized to determine that transaction approval is required from a second user and to output a proposed payment notice to the second device. As one example, identification information associated with the first user (e.g., a user name, etc.), a first device (e.g., a telephone number, etc.), and/or a payment account (e.g., an account number, an account number assigned to the first user, etc.) may be identified by a service provider system 130 (or a merchant computer 105), and a determination may be made to communicate a message to the second device based at least in part upon an evaluation of the identification information. In certain embodiments, at least a portion of the received identification may be utilized to obtain and/or access information associated with the second user and/or the second device (e.g., a telephone number, an email address, etc.). As another example, when requesting a transaction, the first user may enter identification information associated with the second user and/or the second device (e.g., a name of the second user, a telephone number, etc.), and the entered information may be utilized to communicate a notice to the second device. As yet another example, a wallet application associated with the first user may evaluate a proposed transaction, and the wallet application may communicate or direct communication of a notice to a second user and/or second device. A notice communicated by the wallet application may be a notice generated by the wallet application or a received notice that is forwarded by the wallet application to the second user or second device. A wide variety of other techniques may be utilized to facilitate the communication of a notice to the second user, and the techniques described above are provided by way of example only.

A notice may include a wide variety of suitable information as desired in various embodiments including, but not limited to, identification information associated with the first user, information associated with the first device, merchant identification information, information associated with the payment account, a proposed transaction amount, information associated with purchased items and/or services, and/or information associated with any number of VAS. Once received by a second device, a notice may be presented to the second user in order to facilitate review and/or approval of the payment transaction. In certain embodiments, a wallet application (or other application) associated with the second device may evaluate information included in the notice (e.g., identification information for the first user and/or first device, identification information associated with a service provider system, etc.), and the evaluated information may be compared to a white list of approved senders. In the event that the sender is included in the white list, the notice may be presented to the second user. In other embodiments, a notice may be sent as an SMS or email message, and the notice may include one or more links that initiate a wallet application and/or establish communication with a Web server that facilitates review and/or approval of the payment transaction.

The second user may review the proposed transaction and direct communication of one or more responses to the notice. For example, the second device may be utilized to communicate one or more responses to a service provider system 130 or a merchant computer 105. As another example, one or more responses may be communicated to the first device. A response may include approval or denial information associated with a proposed payment transaction and, as desired, information associated with any number of value added services (e.g., shipping address information, receipt delivery information, warranty information, loyalty rewards information, etc.).

A response from the second device may be received at block 620. At block 625, the received response may be evaluated in order to determine whether the proposed transaction has been approved or denied. If it is determined at block 625 that the transaction has been denied, then operations may continue at block 630, and one or more denial messages may be output for communication to one or more recipients, such as a merchant computer 105 and/or the first device. If, however, it is determined at block 625 that the transaction has been approved, then operations may continue at block 635. At block 635, completion of the transaction may be facilitated and, as desired, a wide variety of suitable VAS may be provided.

Operations of the method 600 may end following either block 630 or block 635.

The operations described and shown in the methods 200, 300, 400, 500, 600 of FIGS. 2-6 may be carried out or performed in any suitable order as desired in various embodiments of the disclosure. Additionally, in certain embodiments, at least a portion of the operations may be carried out in parallel. Furthermore, in certain embodiments, less than or more than the operations described in FIGS. 2-6 may be performed.

Embodiments of the disclosure are described above with reference to block and flow diagrams of systems, methods, apparatus, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method, the method comprising:
   receiving, by a service provider system comprising one or more computers in network communication with one or more merchant computers configured to host a webpage comprising inventory information associated with a desired product or service, a request to initiate a card present transaction associated with a first user;
   collecting, by the service provider system, information associated with the card present transaction, wherein the information associated with the card present transaction comprises one or more identifiers associated with the desired product or service, an identifier of a desired payment account, and identification information associated with the first user, wherein the information associated with the card present transaction identifies the card present transaction as a card present transaction;
   determining, by the service provider system, that an authorization of the card present transaction is required from a second user, based at least in part on the information associated with the card present transaction;
   transmitting, by the service provider system, a notification to facilitate an invocation of a transaction module on a mobile device associated with the second user upon determining that the authorization from the second user is required, wherein the transaction module is communicatively coupled to a secure element of the mobile device;
   receiving, by the service provider system, a response from the second user in response to transmitting the notification, wherein the response comprises validation information from the transaction module, wherein:
      the validation information comprises a key or signature retrieved by the transaction module from the secure element; and
      the service provider system verifies the validation information based on the key or signature received from the transaction module; and
   approving or denying, by the service provider system, the card present transaction based on verification of the validation information.

2. The method of claim 1, wherein the response from the second user further comprises a validation of an mPIN based on a comparison of the mPIN to information stored on one or more secure elements of the mobile device, and wherein the method further comprises:
   facilitating, by the service provider system, completion of the card present transaction associated with the first user.

3. The method of claim 1, further comprising receiving, by the service provider system, an identifier associated with the mobile device based on the information associated with the card present transaction, wherein the notification is transmitted to the second user based on the identifier associated with the mobile device.

4. The method of claim 1, wherein the response from the second user further comprises information associated with any number of value added services associated with the card present transaction, including at least one of a shipping address information, receipt delivery information, warranty information, or loyalty rewards information.

5. The method of claim 1, wherein the service provider system receives an identifier of a mobile device associated with the first user for collecting the information associated with the card present transaction.

6. The method of claim 1, wherein the notification of the card present transaction to the second user comprises at least one of the identification information associated with the first user, the identifier of the desired payment account, a proposed transaction amount, information associated with the desired product or service, or information associated with any number of value added services.

7. The method of claim 1, wherein the request to initiate the card present transaction further comprises identification information associated with the second user, and wherein the method further comprises:
   comparing, by the service provider system, the identification information associated with the second user to a white list;
   wherein the transmission of the notification to the second user is based on the comparison; and
   wherein the white list comprises at least one individual permitted to authorize the card present transaction.

8. The method of claim 1,
   wherein the notification to the second user comprises at least a portion of the information associated with the card present transaction and a message that facilitates the invocation of the transaction module on the mobile device associated with the second user, wherein the invocation automatically launches the transaction module.

9. A system comprising:
   at least one processor associated with a service provider system; and
   at least one memory storing computer-executable instructions, wherein the at least one processor is operable to access the at least one memory and execute the computer-executable instructions to:
      communicate over a network with one or more merchant computer configured to host a webpage comprising inventory information associated with a desired product or service;
      receive a request to initiate a card present transaction associated with a first user;
      collect information associated with the card present transaction, wherein the information associated with the card present transaction comprises one or more identifiers associated with the desired product or service, an identifier of a desired payment account, and identification information associated with the first user, wherein the information associated with the card present transaction identifies the card present transaction as a card present transaction;

determine that an authorization of the card present transaction is required from a second user based at least in part on the information associated with the card present transaction;

transmit a notification to facilitate an invocation of a transaction module on a mobile device associated with the second user upon determining that the authorization from the second user is required, wherein the transaction module is communicatively coupled to a secure element of the mobile device;

receive a response from the second user in response to transmitting the notification, wherein the response comprises validation information from the transaction module wherein;

the validation information comprises a key or signature retrieved by the transaction module from the secure element; and the service provider system verifies the validation information based on the key or signature received from the transaction module; and approve or deny the card present transaction, based on verification of the validation information.

10. The system of claim 9, wherein the at least one processor further executes computer-executable instructions to receive an identifier of a mobile device associated with the first user for collecting the information associated with the card present transaction.

11. The system of claim 9, wherein the response from the second user further comprises a validation of an mPIN based on a comparison of the mPIN to information stored on one or more secure elements of the mobile device, and wherein the at least one processor further executes computer-executable instructions to:

facilitate completion of the card present transaction associated with the first user.

12. The system of claim 9, wherein the at least one processor further executes computer-executable instructions to:

receive an identifier associated with the mobile device based on the information associated with the card present transaction, wherein the notification is transmitted to the second user based on the identifier associated with the mobile device.

13. The system of claim 9, wherein the response from the second user further comprises information associated with any number of value added services associated with the card present transaction, including at least one of a shipping address information, receipt delivery information, warranty information, or loyalty rewards information.

14. The system of claim 9, wherein the notification to the second user comprises at least a portion of the information associated with the card present transaction and a message that facilitates the invocation of the transaction module on the mobile device associated with the second user, wherein the invocation automatically launches the transaction module.

15. The system of claim 9, wherein the notification of the card present transaction to the second user comprises at least one of identification information associated with the first user, the identifier of the desired payment account, a proposed transaction amount, information associated with the desired product or service, or information associated with any number of value added services.

16. The system of claim 9, wherein the request to initiate the card present transaction comprises identification information associated with the second user, and wherein the at least one processor further executes computer-executable instructions to:

compare the identification information associated with the second user to a white list wherein:

the transmittal of the notification to the second user is based on the comparison; and the white list comprises at least one individual permitted to authorize the card present transaction.

17. A non-transitory computer-readable media comprising computer-readable instructions stored thereon that when executed by one or more processors of a service provider system cause the one or more processors to:

receive a request to initiate a card present transaction associated with a first user, wherein the service provider system is in network communication with one or more merchant computers configured to host a webpage comprising inventory information indicative of a desired product or service;

collect information associated with the card present transaction, wherein the information associated with the card present transaction comprises one or more identifiers associated with the desired product or service, an identifier of a desired payment account, and identification information associated with the first user, wherein the information associated with the card present transaction identifies the card present transaction as a card present transaction;

determine that an authorization of the card present transaction is required from a second user based at least in part on the information associated with the card present transaction;

transmit a notification to facilitate an invocation of a transaction module on a mobile device associated with the second user upon determining that the authorization from the second user is required, wherein the transaction module is communicatively coupled to a secure element of the mobile device;

receive a response from the second user in response to transmitting the notification, wherein the response comprises validation information from the transaction module, wherein:

the transaction module associates the validation information with the card present transaction and retrieves a key or signature stored on the secure element; and the service provider system verifies the validation information based on the key or signature received from the transaction module; and approve or deny the card present transaction, based on verification of the validation information.

18. The non-transitory computer-readable media of claim 17, wherein the response from the second user further comprises a validation of an mPIN based on a comparison of the mPIN to information stored on one or more secure elements of the mobile device, and wherein the one or more processors further execute computer readable instructions to facilitate completion of the card present transaction.

19. The non-transitory computer-readable media of claim 17, wherein the one or more processors further execute computer readable instructions to receive an identifier associated with the mobile device based on the information associated with the card present transaction, and wherein the notification is transmitted to the second user based on the identifier associated with the mobile device.

20. The non-transitory computer-readable media of claim 17, wherein the response from the second user further comprises information associated with any number of value added services associated with the card present transaction, including at least one of a shipping address information, receipt delivery information, warranty information, or loyalty rewards information.

21. The non-transitory computer-readable media of claim 17, wherein the one or more processors further execute computer-readable instructions to receive an identifier of a mobile device associated with the first user for collecting the information associated with the card present transaction.

22. The non-transitory computer-readable media of claim 17, wherein the notification of the card present transaction to the second user comprises at least one of the identification information associated with the first user, the identifier of the desired payment account, a proposed transaction amount, information associated with the desired product or service, or information associated with any number of value added services.

23. The non-transitory computer-readable media of claim 17, wherein the request to initiate the card present transaction further comprises identification information associated with the second user, and wherein the one or more processors further execute computer-readable instructions to:
compare the identification information associated with the second user to a white list;
wherein the transmission of the notification to the second user is based on the comparison; and
wherein the white list comprises at least one individual permitted to authorize the card present transaction.

24. The non-transitory computer-readable media of claim 17, wherein the notification to the second user comprises at least a portion of the information associated with the card present transaction and a message that facilitates the invocation of the transaction module on the mobile device associated with the second user, wherein the invocation automatically launches the transaction module.

* * * * *